July 31, 1934.  O. T. FRANCIS  1,968,678
TRANSMISSION SYSTEM
Filed Oct. 11, 1932   2 Sheets-Sheet 1

INVENTOR
Oliver T. Francis

July 31, 1934.   O. T. FRANCIS   1,968,678
TRANSMISSION SYSTEM
Filed Oct. 11, 1932   2 Sheets-Sheet 2

INVENTOR
Oliver T. Francis

Patented July 31, 1934

1,968,678

UNITED STATES PATENT OFFICE 1,968,678

TRANSMISSION SYSTEM

Oliver Thomas Francis, San Diego, Calif.

Application October 11, 1932, Serial No. 637,361

13 Claims. (Cl. 250—41.5)

This invention relates to transmission circuits and more particularly to means for signalling by colored lights and means for compensation against various undesirable voltages applied to the inputs and outputs of these circuits.

As is well known in the art of amplification circuits, weak signals of low periodicity are subject to distortion from various sources, such as variations in A, B, and C battery or input voltages.
In submarine cable art for example, the sending of a series of pulsations of the same polarity tends to shift the grid of the first tube off its working range. In photo-electric cell amplication circuits slow variations in the light intensity tends to render such devices operative when it is often desirable to render such devices operative only to sudden changes of light intensities. It is one of the objects of this invention to compensate against such undesirable voltages.

Circuits of this class are by their very nature high resistance circuits and leakage resistance often becomes a factor of considerable importance. It is another object to concentrate the sources of A, B, and C potentials at points electrically remote from the grids of the tubes concerned, where the deleterious effects of leakage resistance are minimized.

It is well known that gas discharge devices can be constructed wherein the anode to cathode drop is substantially independent of current flow. It is an object of this invention to illustrate how a device of this nature may be utilized as a coupling means between the output of one stage of amplification and the input of a second stage.

It is further known that a resistance and a condenser in parallel when fed by a source of potential of a predetermined value thru a gas discharge device constitutes an oscillatory circuit, the frequency of the oscillations depending on the value of the said resistance and condenser and the magnitude of said potential.

It is one of the objects of the invention to illustrate means whereby rapid changes in the input light signal voltage shall effect a change in such an oscillatory circuit, the changes in frequency being amplified and translated into signal variations, but where slow changes in light intensities shall produce no appreciable change in frequency.

Present day transmission systems, such as the teletype, require the sending of a plurality of pulses at successive time intervals to produce a single operation at the receiving station. It is one of the objects of the invention to produce such results by the transmission of single pulses of light, of a plurality of colors, the colors present in said pulses being the determining factor of the operation performed, thereby eliminating the necessity of synchronization.

With these and other objects in view, the invention may best be understood by reference to the following detailed description taken in connection with the drawings wherein.

Figure 1:
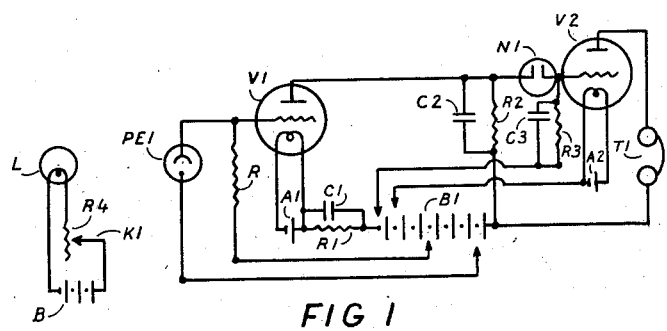
Fig. 1 is a diagrammatic illustration of an amplifying circuit for receiving light impulses.

Referring to Fig. 1, light of predetermined magnitude from source L falls upon photo-electric cell PE1. Contact K1 is so connected in the circuit that it may effect an increase or a decrease in the intensity of this light by varying the amount of resistance R4 in series with source of potential B and filament of light L. Photo-electric cell PE1 is connected in series with resistance R. The resistance R is connected in the input circuit of V1 and is connected to battery B1 at such a point as to tend to place a positive potential on the grid of V1 to neutralize the excessive negative potential impressed thereon by R1 C1.

In the output circuit of V1 has been connected a load consisting of resistance R2 and condenser C2 in parallel. A gas discharge device N1 is used to couple the input circuit of V2 and the output circuit of V1. The grid leak R3 of vacuum tube V2 has been placed in parallel with a small condenser C3 to render the gas discharge device N1 oscillatory. The grid resistor R3 has been connected to battery B1 at a point more negative than the point to which the filament of V2 is connected in order to neutralize the excessive positive bias impressed on the grid of V2 by this combination. The size of the condenser C3 will in general be smaller than condenser C2 and C2 will in turn be smaller than C1. In the output circuit of V2 has been connected translating device T1.

The oscillatory circuit of N1 may be traced as follows: Positive terminal of B1, resistance R2 and condenser C2 in parallel, gas discharge device N1, resistance R3 and condenser C3 in parallel to negative terminal of B1. The frequency of oscillations of this circuit will depend upon the voltage impressed on N1, which in turn will depend on the voltage drop thru resistance R2. The resistance R1 has been chosen of considerable magnitude so that slow changes in the input voltages will not cause appreciable changes in the output current (Ip) and consequently no appreciable change in the voltage (Eg2) across the load will be evident. Rapid changes in intensity of light from L will however produce a considerable change in voltage impressed on N1 which in turn will produce an increase or decrease in frequency. These increases and decreases in frequency may be read as dots and dashes in the International Code, or by tuned circuits used to operate recording device.

The amplifying characteristics of the circuit may be clearly brought out by a mathematical analysis, wherein $Eg1$ is the input voltage from the photo-electric cell PE1; Z1 equals the value of the combination R1 C1 in ohms, Z2 equals the value of the combination R2 C2 in ohms, which values of course vary with frequency of $Eg1$; $Mu(u)$ equals the amplification factor of all tubes used in the circuit; $Rp$ equals the plate impedance of V1.

$$Ip \text{ equals } \frac{uEg1}{Z1(u \text{ plus } 1) \text{ plus } Rp \text{ plus } Z2}$$

$$Eg2 \text{ equals } IpZ2 \text{ equals } \frac{uEg1Z2}{Z1(u \text{ plus } 1) \text{ plus } Rp \text{ plus } Z2}$$

$$\frac{Eg2}{Eg1} \text{ equals } \frac{uZ2}{Z1(u \text{ plus } 1) \text{ plus } Rp \text{ plus } Z2}$$

From the above analysis it is at once evident that where R1 and C1 are of large magnitude with respect to R2 C2 the amplification of the stage is large for rapidly changing currents but very low for frequencies of slow periodicity, and further that the stage is peaked to a certain frequency and the amplification of the stage is less for frequencies above and below this frequency.

Figure 2:
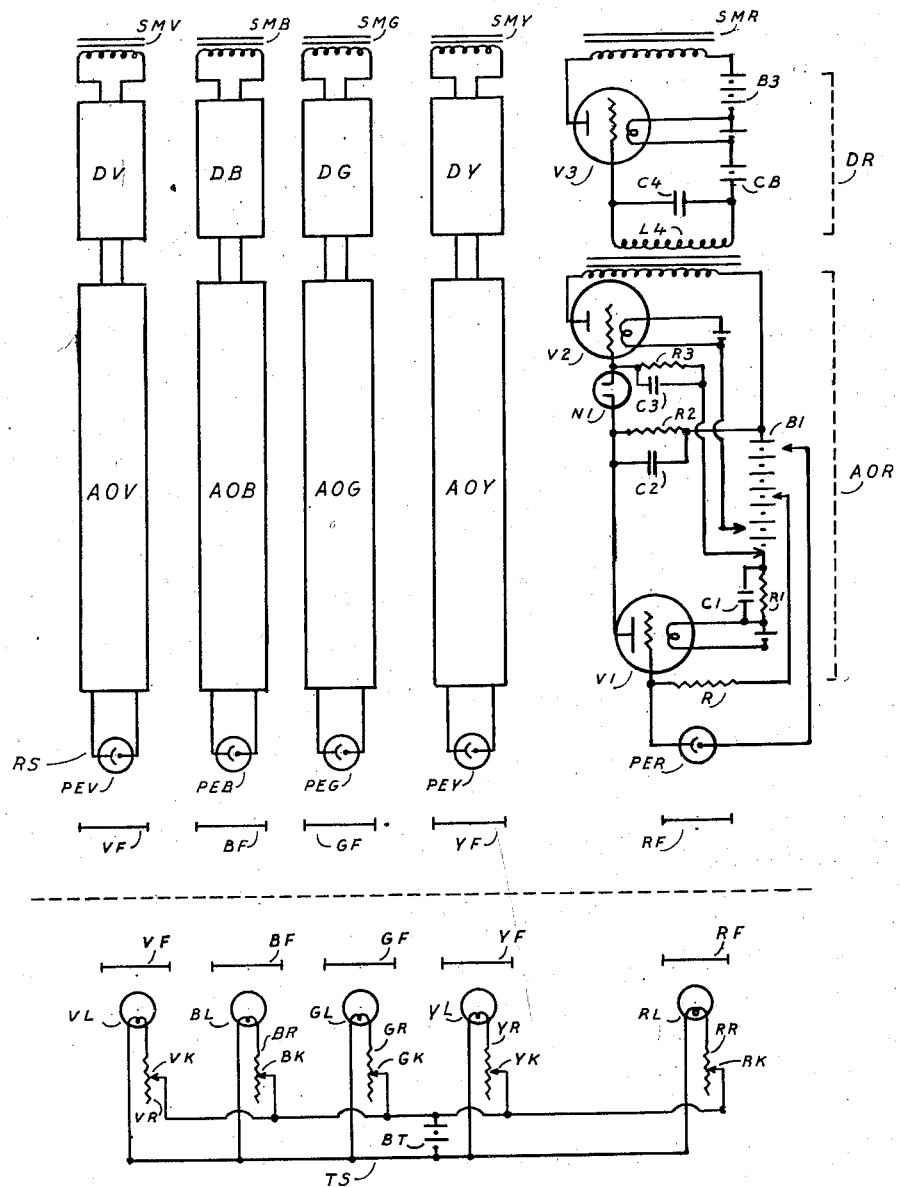
Fig. 2 is a diagrammatic illustration of a transmission system utilizing predetermined combinations of colors to produce desired operations.

Fig. 2 illustrates a means of operating a plurality of selector magnets such as might be used in transmitting telegraphic signals by transmission of predetermined combinations of colored lights, or similar purposes. In this figure transmitting station TS is composed of red light RL, yellow light YL, green light GL, blue light BL, violet light VL. Corresponding filters RF, YF, GF, BF, VF appear in front of each light. A battery BT furnishes current to these lights. Contacts RK, YK, GK, BK, VK regulate the intensity of each of these lights by increasing or decreasing the amount of resistance RR, YR, GR, BR, VR in series with the individual lights. A suitable reflecting system (not shown) is provided for directing the light towards the receiving station.

At the receiving station RS a series of color filters and lenses RF, YF, GF, BF, VF concentrates the light on the photo-electric cells PER, PEY, PEG, PEB, PEV. An amplifier oscillator AOR similar to that illustrated in Fig. 1 and bearing similar labels supplies energy thru the primary of transformer L4 to a tuned circuit L4 C4, resonant to a frequency higher than the normal oscillating frequency of the gas discharge device oscillator N1. A "C" bias detector DR, composed of vacuum tube V3, batteries CB, and B3 increases and decreases the current thru selector magnet SMR, which in turn produces one of the operations necessary for the printing of one letter on the telegraph printer (not shown), or similar purposes known in the art and forming no part of this invention.

The other amplifier oscillators are similar and are diagrammatically represented by AOY, AOG, AOB, AOV. The detectors DY, DG, DB, DV are similar to DR and operate selector magnets SMY, SMG, SMB, SMV, respectively.

To illustrate the operation of the device assume a desired operation will be preformed upon increased current thru SMR, and decreased current thru SMV. In this instance contact RK would be pulled downwardly thereby decreasing the light striking PER, and increasing the voltage impressed on N1, and as a result increasing the frequency of its oscillations. Since the circuit L4 C4 is tuned to this higher frequency, the current thru SMR will be increased. Simultaneously with RK being pulled downwardly, VK is pulled upwardly thereby increasing the light striking PEV and decreasing the current thru SMV. It is seen that the desired operation will be preformed by a sudden decrease in red light and an increase in violet light the intensity of the other lights remaining constant. The simultaneous operation of these contacts may be accomplished manually by the person operating the device or by any other known means for simultaneously varying the intensity of a plurality of different colored lights wherein the intelligence to be transmitted governs the colors to be varied.

Figure 3:
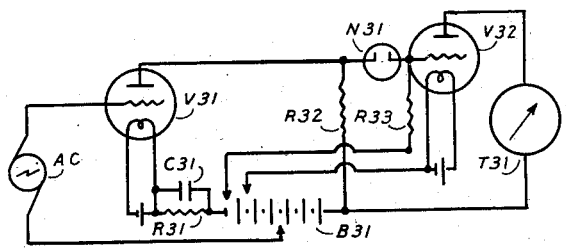
Fig. 3 shows how the invention may be applied to submarine cable art, or similar circuits.

Fig. 3 illustrates how the circuit may be adapted to the amplification of signal currents the A. C. component of which may be superimposed on a variable direct current such as in submarine cable art.

In this circuit an A. C. source of voltage AC is connected in the input circuit of vacuum tube V31, the grid return of which is connected to the filament V31 thru a positive source of potential B31, in order to neutralize the excessive IR drop thru R31 C31. In the output circuit of V31 is connected load R32. The grid of V32 is coupled to this stage thru gas discharge device N31 which in the present instance is not in an oscillatory condition. The grid of V32 is connected to B31 thru resistance R33 at a point more negative than the filament of V32 in order to compensate for the positive potential impressed on the grid of V32 by the IR drop thru R33. A translating device such as a siphon recorder T31 has been connected in the output circuit of V32. Since the values of R31 C31 have been so chosen as to have a high impedance to the currents of slow periodicity such as ground currents and the D. C. component which results from the reception of a series of pulsations of the same polarity, the recorder will not be thrown off its working range.

The filaments of all the tubes have been heated by separate batteries but it is apparent that a common source of heating could have been used by using tubes with separate heating elements.

The sources of colored lights have been schematically indicated, and it will be understood that any known means could be used such as colored glow tubes filters being disposed in front of same for the screening of undesirable colors; or a common light source whose light is split by means of an optical arrangement into a plurality of colors. A further possibility consists in using color sensitive photo-cells in place of the color filters. The term light will be construed broadly as to include light radiations whether in the visible or invisible spectrum.

It is further apparent that several of the elements illustrated in the diagrams could be contained in a single evacuated container and the term vacuum tube will be construed in the following claims as an anode, a cathode, and a control electrode even through they be contained in the same evacuated container with other elements of the circuit illustrated.

It is further obvious that the invention may take widely different forms without departing from the spirit of the invention as defined in the following claims and it is not to be limited in scope except by prior art and as described in the appended claims.

What is claimed is:

1. In a light signalling system, a source of light, means for producing signal intensity variations in said source of predetermined duration, a receiving station, a photo-electric device at said receiving station for producing voltage variations in accordance with said intensity variations, a vacuum tube havng an input and an output circuit, means for applying said voltage variations to said input circuit, a source of voltage and a load resistance connected in said output circuit, means for bypassing surges of current produced by variations in said light of shorter duration than said signal variations around said load resistance, said last mentioned means comprising a condenser shunting said load resistance, means for producing frequency variations in accordance with said voltage variations, said last means comprising a gas discharge device in series with said load resistance, a second resistance, a second condenser shunting said second resistance, and means for translating said frequency variations into signals.

2. In a light signalling system, a source of light, a keying device for producing signal light intensity variations in said source of predetermined duration, a receiving station, a light sensitive device at said receiving station for changing said intensity variations into voltage variations, a vacuum tube having an input and an output circuit, means for applying said voltage variations to said input circuit, a source of voltage and a load resistance connected in said output circuit, a relaxation circuit for producing frequency variations in accordance with said voltage variations, said relaxation circuit comprising the series connection of said source of voltage, said load, a gas discharge device, and a second resistance shunted by a condenser, means for bypassing around said load surge of current produced by variations in said light of shorter duration than said signal variations, said last mentioned means comprising a second condenser shunting said load resistance, means for reducing the amplification of said vacuum tube for changes in voltage produced by changes in light of longer duration than said predetermined duration, said last means comprising a third resistance shunted by a third condenser connected in said input and said output circuit of said vacuum tube.

3. In a light signalling system, a source of light a keying device for producing intensity variations in said light of predetermined signal time duration, a receiving station, a photo-electric cell at said receiving station for changing said intensity variations in said light into voltage variations, a vacuum tube having an input and an output circuit, means for impressing said voltage variations on said input circuit, a relaxation circuit, means for producing frequency variations in said relaxation circuit in accordance with said voltage variations, said last mentioned means comprising a resistance common to said relaxation and said output circuits, means for bypassing surges of current around said resistance of shorter duration than said signal time duration said last means comprising a condenser shunting said resistance, means for reducing the amplification of said vacuum tube to changes in input voltages of longer duration than said predetermined signal time duration, said last means comprising a second resistance shunted by a second condenser common to said input and said output circuit, and means for translating said frequency variations into signal variations.

4. In a light signalling system, a plurality of different colored lights, keying devices for producing variations in intensity of said lights of predetermined time duration, a receiving station, a plurality of photo-electric cells at said receiving station, color filters for rendering each of said cells sensitive to a different one of said colored lights, a plurality of vacuum tubes having input and output circuits, means for impressing variations in voltage across each of said cells on the input circuit of a separate one of said vacuum tubes, a relaxation circuit for each of said vacuum tubes, means for varying the frequency of oscillations in each of said relaxation circuits, said last means comprising a separate resistance shunted by a condenser common to said relaxation circuit and the output circuit of said separate one of said vacuum tubes, a separate resonant rectifier circuit for changing frequency variations in each of said relaxation circuits, into magnitude current variations, a separate selector magnet controlled by said magnitude variations of each of said rectifier circuits.

5. In a light signalling system, a plurality of different colored lights, a plurality of keying devices for varying the intensity of said lights for predetermined signal time duration, a receiving station, a plurality of receiving units at said receiving station, each of said units comprising a color filter for passing light of one color only, a light sensitive means for changing light variations of said one color only into voltage variations, a vacuum tube having an input and an output circuit, means for applying said voltage variations to said input circuit, a relaxation circuit, said relaxation circuit comprising the series connection of a source of voltage, a gas discharge device, and a resistance shunted by a condenser, means for producing variations in frequency of discharge of said device in said relaxation circuit, said last means comprising a second resistance shunted by a second condenser, said second resistance being common to said relaxation and said output circuits, means for reducing the amplification of said vacuum tube to voltages produced by slow variations in said light, said last means comprising a third resistance shunted by a third condenser common to said input and said output circuit, a rectifier circuit resonant to a frequency different than the normal discharge frequency of said relaxation circuit for changing said frequency variations into current magnitude variations, a selector magnet operable by said current magnitude variations.

6. In an electrical circuit, a vacuum tube having an input and an output circuit, a source of signals for said input circuit, a load connected in said output circuit, means for producing variations in frequency of electrical current in accordance with magnitude variations of said signals, said means comprising the series connection of a gas discharge device, a resistance shunted by a condenser, and said load, and means for translating said variations in frequency into signals.

7. In an electrical circuit, a vacuum tube having an input and an output circuit, a source of signal voltage of predetermined time duration connected in said input circuit, a load connected in said output circuit, means for rendering the amplification of said vacuum tube small for voltage variations from said source of longer period than said predetermined time duration, said means comprising a resistance and a condenser connected in parallel in said input and said output circuit, means for producing frequency variations of electrical current in accordance with magnitude variations of said signal, said last means comprising the series connection of a gas discharge device, a resistance shunted by a condenser, and said load, and means for translating said frequency variations into signals.

8. In an electrical circuit, a vacuum tube having an input and an output circuit, a source of signal voltage of predetermined time duration connected in said input circuit, a load resistance and a source of current connected in said output circuit, means for bypassing undesirable surges of current appearing in said output circuit of shorter duration than said predetermined time around said resistance, said means comprising a condenser shunting said resistance, means for producing frequency variations in electrical current in accordance with magnitude variations of said signal voltage, said last means comprising the series connection of a gas discharge device, a second resistance shunted by a second condenser, said source of current, and said load resistance, and means for translating said frequency variations into signals.

9. In an electrical circuit, a vacuum tube having an input and an output circuit, a source of signal voltage of predetermined time duration connected in said input circuit, a source of current and a load resistance connected in said output circuit, means for bypassing around said load undesirable surges of current produced by said source of signal voltage of shorter duration than said predetermined time, said means comprising a condenser shunting said load resistance, means for rendering the amplification of said tube small for surges of current produced by said source of signal voltage of longer duration than said predetermined time, said last means comprising a second resistance shunted by a second condenser connected in said input and said output circuit, means for producing frequency variations in electrical current in accordance with magnitude variations of said signal, said last mentioned means comprising the series connection of a gas discharge device, a third resistance shunted by a third condenser, said source of current, and said load resistance, and means for translating said frequency variations into signals.

10. In an electric circuit, a vacuum tube having an input and an output circuit, a source of signals for said input circuit, a load connected in said output circuit, means for producing frequency variations of electrical current in accordance with the magnitude variations of said signal, said means comprising the series connection of a gas discharge device, a resistance shunted by a condenser, and said load, means for rectifying said frequency variations, said last means comprising a second vacuum tube having an input and an output circuit, said input circuit of said second vacuum tube being connected across said resistance, and means for applying rectified current in the output circuit of said second tube to a selector magnet.

11. In a light signalling system, a transmitting station, means for producing a plurality of different colored lights at said transmitting station, a receiving station comprising a plurality of units, each of said units comprising a color filter for passing a different one of said colored lights, a light sensitive device for changing light passed by said color filter into voltage variations, a vacuum tube having an input circuit and an output circuit, means for applying said voltage variations to said input circuit, a load connected in said output circuit, means for producing frequency variations in electric current in accordance with magnitude variations in said voltage variations, said last means comprising the series connection of a gas discharge device, a resistance shunted by a condenser, and said load, means for producing rectified current in accordance with said frequency variations, said last mentioned means comprising a second vacuum tube having an input and output circuit, said input circuit of said second vacuum tube being connected across said resistance, a selector magnet, and means for applying said rectified current to said selector magnet.

12. In an electric circuit, a vacuum tube having an input and an output circuit, a source of signals for said input circuit, a load connected in said output circuit, means for producing variations in frequency of electrical current in accordance with magnitude variations of said signals, said means comprising the series connection of a gas discharge device, a resistance shunted by a condenser, and said load, means for rendering the impedance of said load small to said frequency variations, said last means comprising a condenser shunting said load, and means for translating said frequency variations into signals.

13. In an electric circuit, a vacuum tube having an anode, a cathode, and a control electrode, a source of signal voltage connected between said cathode and said control electrode, a source of current, and a load connecting said cathode and said anode, means for changing voltage magnitude variations appearing across said load into frequency variations, said means comprising the series connection of a gas discharge device, a resistance shunted by a condenser, and said load, a second vacuum tube having an anode, a cathode and a control electrode, for amplifying said frequency variations, said control electrode of said second vacuum tube being connected to said anode of said first tube through said gas discharge device, and a conductive path connecting said cathode of said second tube to said cathode of said first tube, and means for translating said frequency variations into signals.

OLIVER THOMAS FRANCIS.